United States Patent [19]

Ando

[11] Patent Number: 5,056,975
[45] Date of Patent: Oct. 15, 1991

[54] ELASTICALLY COMPRESSIBLE CONICAL LOCK WASHER

[75] Inventor: Tsuneo Ando, Aichi, Japan

[73] Assignee: TRW Steering & Industrial Products (Japan) Co. Ltd., Aichi, Japan

[21] Appl. No.: 506,462

[22] Filed: Apr. 9, 1990

[30] Foreign Application Priority Data

May 31, 1989 [JP] Japan .................................. 1-137796

[51] Int. Cl.⁵ ........................ F16B 39/24; F16B 43/02
[52] U.S. Cl. .................................... 411/155; 411/162; 411/544; 411/916
[58] Field of Search ............... 411/154, 155, 160, 162, 411/187, 188, 428, 544, 916, 156

[56] References Cited

U.S. PATENT DOCUMENTS

| 1,031,970 | 7/1912 | Stockford | 411/162 |
| 1,043,721 | 11/1912 | Prince | 411/162 |
| 2,069,402 | 2/1937 | Cowlin | 411/162 |
| 2,179,575 | 11/1939 | Hosking | 411/162 |

FOREIGN PATENT DOCUMENTS

| 2649077 | 5/1977 | Fed. Rep. of Germany | 411/162 |
| 113083 | 1/1926 | Switzerland | 411/428 |

*Primary Examiner*—Neill R. Wilson
*Attorney, Agent, or Firm*—Tarolli, Sundheim & Covell

[57] ABSTRACT

A washer for use in fastening two members by a bolt is disclosed herein. The washer comprises an elastic body disposed between a head of the bolt and a seat surface corresponding to a surface of one member of the members. The body has a hole to allow for passage of a shank of the bolt. At least one projection is provided on a surface of the body facing the seat surface for engaging with the seat surface. The surface of the projection contacting with the seat surface is formed in a smooth arc.

1 Claim, 2 Drawing Sheets

5,056,975

ELASTICALY COMPRESSIBLE CONICAL LOCK WASHER

BACKGROUND OF THE INVENTION

1. Field of the Invention

The present invention relates to a washer and, particularly, relates to an improvement in a washer which can prevent a bolt or a nut from loosening and which is able to obtain secure tightening thereof.

2. Description of the Prior Art

In general, a first member 1 and a second member 2 are fastened together by a bolt 3 as shown in FIG. 5. In this case, a shank 4 of the bolt 3 is passed through a hole 5 provided in the first member 1. A threaded portion 6 formed on the shank 4 is engaged in a threaded hole 7 provided in the second member 2 to fasten the first member 1 to the second member 2.

An elastic washer 10 is disposed between a head 8 of the bolt 3 and a seat surface 9 or a surface of the first member 1 facing the head 8 to prevent any loosening of the bolt and to effect secure tightening thereof. In this arrangement, when slippage occurs on the contacting surface $C_2$ between the washer 10 and the seat surface 9, rather than the contacting surface $C_1$ between the head 8 and the washer 10, the bolt and the washer are rotated together and the bolt is not fully tightened.

Even if the bolt and the washer are not rotated together, frictional damage or heating occurs on the contacting surface $C_1$ with the effect that secure fastening of the bolt is prevented because of an uneven frictional coefficient. To avoid such an inconvenience, heretofore, a plurality of projections 11 has been provided on a surface of a washer 10 facing a seat surface 9 to prevent the washer from slipping on a contacting surface $C_2$ or a seat surface, as shown in FIG. 6. The point of each of those projections 11 is sharply formed to bite the seat surface 9. An oil is applied to the bolt and the washer to prevent heating of the contacting surface $C_1$.

However, in the prior art as mentioned above, flaws are formed on the seat surface by the points of the projections 11. Accordingly, as shown in FIG. 6, one or more cracks 12 occur in the first member 1 thereby resulting in the destruction of this first member 1.

The above defect has also occured in a washer of a type such as a toothed dish spring or a toothed washer whereby teeth bite into a seat surface. The prior art has also the disadvantage that frictional damage occurs on the contacting surface $C_1$ since an oil film is displaced as the bolt is fastened.

SUMMARY OF THE INVENTION

An object of the present invention is to provide a washer which is able to overcome the disadvantages of the prior art as mentioned above.

A washer according to the present invention comprises an elastic body which is disposed between a head of a bolt and a seat surface. The seat surface corresponds to a surface of one member of two members to be fastened.

The body is provided with a hole to allow for passage of a shank of a bolt for fastening the members.

At least one projection is provided on a surface of the body facing the seat surface. The projection engages with the seat surface. The projection acts to prevent the washer from slipping or rotating on a seat surface. The surface of the projection contacting with the seat surface is formed in a smooth or uniform arc. In one embodiment, the projection may be provided by shaping a portion of the body in a semi-circular section to form a recess between the head of the bolt and a surface of the body facing the head. An oil is retained in the recess.

The projection may be formed by cold forging.

In the other embodiment, a plurality of projections is disposed on the body at different distances from the center of the body.

When the members are fastened together by the bolt, the projection engages with the seat surface. The projection engages with the seat surface without causing any flaws or cracks on the seat surface since the surface of the projection contacting with the seat surface is formed in a smooth arc, and the projection prevents the washer from the slipping on the seat surface.

Because oil can be retained in the recess, frictional damage or heating does not occur on the contacting surface $C_1$, thus enabling securer fastening of the bolt.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE PREFERRED EMBODIMENTS

Figure 1:
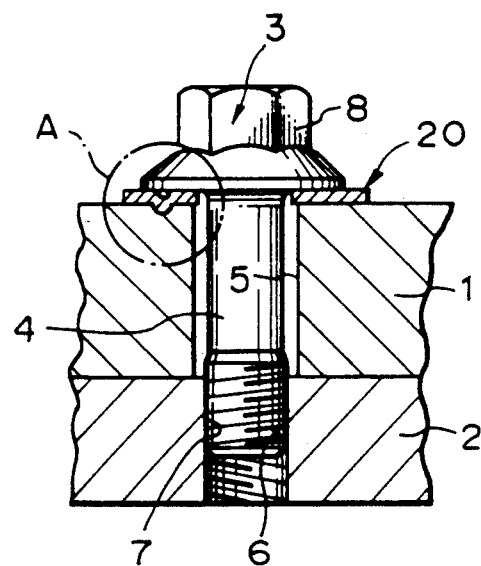
FIG. 1 is a longitudinal sectional view showing the fastening of members by using a washer according to the present invention.
Figure 2:
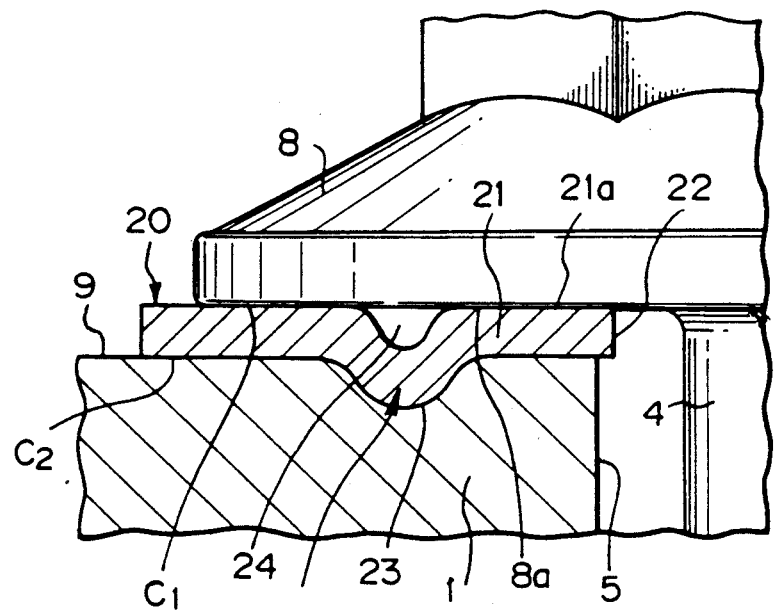
FIG. 2 is an enlarged view of the portion A shown in FIG. 1.
Figure 3:
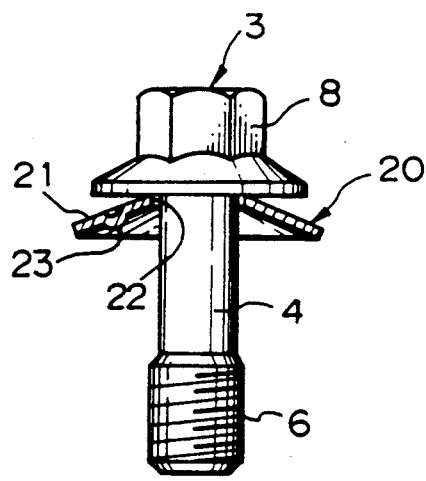
FIG. 3 is an elevational view in which the washer is shown in section and is mounted on a bolt in a free state.
Figure 5:
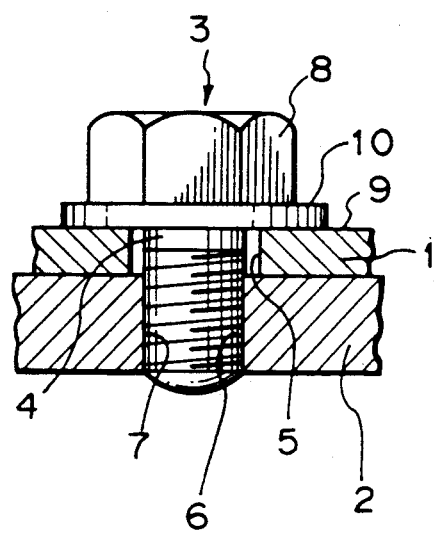
FIGS. 5 and 6 are sectional views showing the use of a washer according to the prior art.
Figure 6:
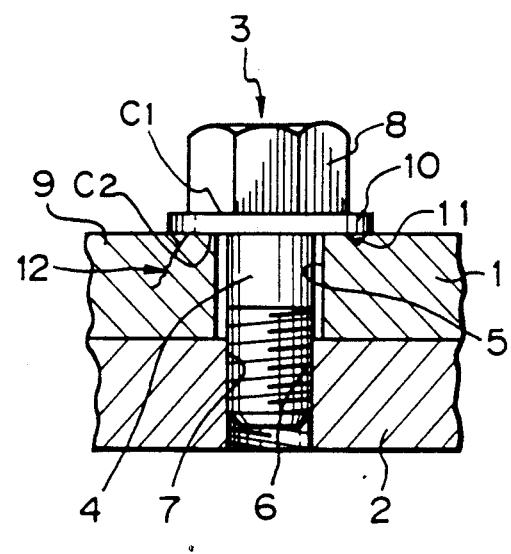

Referring now to FIGS. 1 to 3, a first embodiment of a washer according to the present invention is illustrated. In these drawings, the same reference numbers are applied to the same parts as in FIGS. 5 and 6.

The washer 20 of the present invention is disposed between a head 8 of a bolt 3 and a seat surface 9 of a first member 1 which is fastened to a second member 2. The washer has an elastic body 21. In this embodiment, the body 21 comprises a circular elastic plate. The body is provided with a hole 22 disposed at the center of the body to allow for passage of a shank 4 of the bolt. The body is preferably formed in frust-conical configuration in the free state to obtain full elasticity, as shown in FIG. 3.

The body is provided with at least one projection 23 which acts to prevent the washer from slipping on the seat surface 9. The projection is disposed on a surface of the body 21 facing the seat surface 9 and engages with the seat surface.

It is noted that the contacting surface 23a of the projection 23 with the seat surface 9 is formed in a smooth arc (see FIG. 3).

The projection is formed by shaping a portion of the body 21 in a semi-circular section as shown in FIG. 2. The shaping may be carried out by cold forging. Because of the semi-circular projection, a semi-circular space or recess 24 is formed between a surface 21a of the body facing the head 8 and a surface 8a of the head 8. This recess acts as a reservoir for an oil applied between the head of the bolt and the washer to prevent the oil leaking between the head 8 and the washer 20.

In the above embodiment, a plurality of projections may be used and an oblong, oval or egg-shaped projection may be used.

Figure 4:
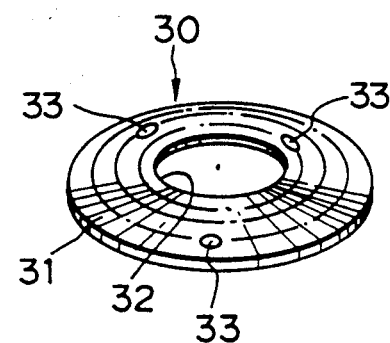
FIG. 4 is a perspective view of a washer according to another embodiment of the present invention.

Referring to FIG. 4, the another embodiment of a washer according to the present invention is illustrated. In the embodiment, the washer 30 comprises an elastic body 31 and a hole 32 provided in the body to allow for passage of the shank 4 of the bolt 3 and a plurality of anti-slipping projections 33. The projections are disposed on the body at different distances from the center of the body.

The arrangement of the projections at different distances from the center of the body enables the washer to be used again. When the washer is re-used, the original position of the projections on the seat surface is changed with the result that the washer can be re-used 10 times more than that of the prior art washer as mentioned above.

As shown in FIG. 1, when the bolt 3 is engaged in a threaded hole 7 in the second member 2 to fasten the members 1 and 2 together, the washer 20 (or 30) is disposed in a depressed configuration shown in FIGS. 1 and 2 from the free state ash shown in FIG. 3 between the head 8 of the bolt and the seat surface 9 of the member 1 and the projection 23 or projections 33 engage with the seat surface 9.

In the above, the washer is depressed in a flat configuration by a fastening force of the bolt less than 500 kgf to firmly fasten the members 1 and 2.

According to the present invention, the projection (or projections) engages with the seat surface without causing any crack on the seat surface since the contacting surface of the projection with the seat surface is formed in a smooth arc configuration. Lack of oil is prevented by means of the oil reservoir so that a stable and firm fastening of the members can be carried out.

From the above description of preferred embodiments of the invention, those skilled in the art will perceive improvements, changes and modifications. Such improvements, changes and modifications within the skill of the art are intended to be covered by the appended claims.

What is claimed is:

1. A washer receivable between first and second members to be fastened together, said washer comprising:

a body having an axis, an annular surface defining a circular opening centered on said axis, a first side surface having a major portion and a projecting portion, and a second side surface spaced axially from said first side surface, said second side surface having a major portion and a recessed portion aligned radially with said projecting portion of said first side surface;

said body having an unstressed condition wherein said major portions of said side surfaces have frustoconical shapes;

said body being elastically compressible between said first and second members from said unstressed condition to a stressed condition wherein said major portions of said side surfaces have flattened planar shapes, and wherein said major portions of said side surfaces abut against the first and second members; and said washer further comprising a second projecting portion of said first side surface, said projecting portions have semi-circular cross sectional shapes and retaining said shapes when said body is compressed into said stressed condition, said projecting portions having locations on said body at different distances from said axis.

* * * * *